United States Patent
Strait

(10) Patent No.: US 9,148,314 B2
(45) Date of Patent: Sep. 29, 2015

(54) INTERFERENCE CANCELLATION IN WIRELESS OFDMA WITH MIMO SPATIAL MULTIPLEXING

(71) Applicant: Metanoia Communications Inc., Hsinchu (TW)

(72) Inventor: Jeffrey C. Strait, Reno, NV (US)

(73) Assignee: Metanoia Communications Inc. (TW)

( * ) Notice: Subject to any disclaimer, the term of this patent is extended or adjusted under 35 U.S.C. 154(b) by 240 days.

(21) Appl. No.: 13/915,253

(22) Filed: Jun. 11, 2013

(65) Prior Publication Data

US 2014/0362766 A1 Dec. 11, 2014

(51) Int. Cl.
*H04L 25/03* (2006.01)
*H04L 25/02* (2006.01)
*H04B 7/04* (2006.01)

(52) U.S. Cl.
CPC ...... *H04L 25/03006* (2013.01); *H04L 25/0204* (2013.01); *H04L 25/03949* (2013.01); *H04L 25/03968* (2013.01); *H04B 7/0417* (2013.01)

(58) Field of Classification Search
None
See application file for complete search history.

(56) References Cited

U.S. PATENT DOCUMENTS

2014/0256341 A1* 9/2014 Nayeb Nazar et al. .... 455/452.1
2014/0335869 A1* 11/2014 Choi et al. .................. 455/438

OTHER PUBLICATIONS

"Macro-Femto Inter-Cell Interference Mitigation for 3GPP LTE-A Downlink", Ming Huang and Wen Xu, 2012, IEEE.*
"An Inter-Cell Interference Cancellation for Downlink Layer-1/Layer-2 Control Channels in LTE/LTE-Advanced Heterogeneous Networks", Masayuki Miyashita et al, Jun. 2-5, 2013, IEEE.*

* cited by examiner

*Primary Examiner* — Habte Mered
(74) *Attorney, Agent, or Firm* — Han IP Corporation; Andy M. Han

(57) ABSTRACT

Various embodiments of techniques related to interference cancellation in wireless OFDMA with MIMO spatial multiplexing are provided. In one aspect, a method receives wireless communication downlink signals from a first base station and a second base station. The method cancels interference of wireless downlink communications between the first base station and the communication device by the second base station by calculating an equalizer solution that orthogonalizes the downlink signals from the first and the second base stations.

25 Claims, 14 Drawing Sheets

INTERFERENCE CANCELLATION IN WIRELESS OFDMA WITH MIMO SPATIAL MULTIPLEXING

BACKGROUND

1. Technical Field

The present disclosure relates to telecommunication and, more specifically, to wireless communication.

2. Description of Related Art

The new 4G wireless technology standard termed Long Term Evolution-Advanced (LTE-A) utilizes the well-known modulation scheme known as orthogonal frequency division multiple access (OFDMA). It is a multicarrier technique in which the transmit spectrum is divided into K orthogonal subcarriers equally spaced in frequency. The method has been used for many years in both wireline broadband communications and wireless local area networks (WLAN). LTE-A provides a minimum of 1000 Mbps throughput in the downlink (DL) and 500 Mbps in the uplink (UL). The spectral bandwidth for LTE-A is 100 MHz, using up to five component carriers each with a component bandwidth of up to 20 MHz. LTE-A also includes support for both frequency domain duplexing and time domain duplexing.

LTE-A also employs multiple antenna methods such as spatial multiplexing and transmit diversity. Spatial multiplexing (SM) is a multiple-input and multiple-output system (MIMO) formulation enabled by configuring multiple antennas separated in space. The spatially separated antennas provide separate and distinct transmission channels allowing the transmitter-receiver pair to extract independent signals from each channel while cancelling interference from the other transmission paths. When combined, OFDMA and MIMO-SM provide orthogonality in both frequency and space. LTE-A supports up to eight antennas per modem.

LTE is deployed in various cell-type structures with the coverage area varying from a macro-cell area of ~20 km diameter to small-cells such as femtocells and microcells, which are much smaller with cell coverage areas sized for servicing buildings or small campus environments. These different cells may use the same frequency spectrum, which causes direct interference. Generally, LTE interference scenarios include the following: 1) interference between a small-cell and a macro-cell, and 2) interference between two macro-cells near the cell boundary.

Wireless communications systems need to contend with radio signal propagation impairments that include multipath fading, noise, and interference. Multipath fading results from a transmitted radio signal traversing many different paths from a transmitting antenna to a receiving antenna as a result of reflections from both man-made and natural environmental objects. The multiple reflected signals (including a possible line-of-sight signal) combine at the receiver to form a transmission path impulse response (with an associated transmission path frequency response). Depending on the characteristics of this response, it is possible for parts of the transmission channel to have deep nulls, which can be time-varying as a result of movement of the transmitter, the receiver, and the objects causing reflections. A wireless MIMO system has different transmission paths for its spatially separated antennas. MIMO signal processing increases the probability that the transmit signal can be correctly received at the decoder while some of the transmission paths are subject to harsh attenuation as a result of the multipath fading problem. Some examples of MIMO system configurations are shown in FIGS. 1A-1D. FIG. 1A illustrates a scenario of a single cell and a single unit (SU) having single-input and single-output (SISU) capability. FIG. 1B illustrates a scenario of a single cell and a single unit having multiple-input and single-output (MISO) capability. FIG. 1C illustrates a scenario of a single cell and a single unit having MIMO capability. FIG. 1D illustrates a scenario of multiple cells (two cells shown) and a single unit having MIMO capability.

SUMMARY

Various embodiments of an interference cancellation scheme are described herein. Techniques of the scheme cancel interference in the downlink channel observed at the user equipment (UE) caused by macro-cell and small-cell base station (hereinafter referred to as an Evolved Node B, or eNodeB) transmissions using the same frequency spectrum in the service area of the macro-cell. The techniques are also applicable to the case where user equipment is near the boundary between two adjacent macro-cells and experiencing interference from one of the base stations while linked with the other base station. A primary concern of the present disclosure is frequency domain signal processing from the point at the input to the OFDM signal generation block in the base station transmitter to the point on the UE receiver at the output of the fast Fourier transform (FFT) demodulator, including the MIMO signal processing functionality.

In one aspect, a method may include receiving, by a communication device, wireless communication downlink signals from a first base station and a second base station. The method may also include cancelling, by the communication device, interference of wireless downlink communications between the first base station and the communication device by the second base station. The cancelling may include calculating an equalizer solution that orthogonalizes the downlink signals from the first and the second base stations.

In one embodiment, the receiving may include receiving the wireless communication downlink signals in accordance with the LTE standard of a variation thereof.

In one embodiment, the communication device may include a MIMO communication device.

In one embodiment, a quantity of MIMO spatial channels of the communication device equals a sum of a quantity of MIMO spatial channels of the first base station and a quantity of MIMO spatial channels of the second base station.

In one embodiment, in calculating the equalizer solution the method may include calculating a MIMO equalizer solution using a minimum mean square error (MMSE) method or a zero forcing (ZF) method.

In one embodiment, in receiving the method may include attempting activation, by the communication device, in a first wireless network associated with the first base station when the communication device is in an area covered by a second wireless network associated with the second base station. A frequency spectrum used by the first wireless network and a frequency spectrum used by the second wireless network may be the same.

In one embodiment, the first base station and the second base station may be synchronized such that transmissions by the first and the second base stations occupy the same spectrum and that symbols from the first and the second base stations are approximately aligned to allow the communication device to receive signals from the first and the second base stations without inter-symbol interference over time.

In one embodiment, radio frames from the first and the second base stations may be aligned such that reference signals from the first and the second base stations overlap in same resource elements of a resource grid.

In one embodiment, the communication device may be aware of both the first base station and the second base station. The communication device may detect primary and secondary synchronization signals from the first and the second base stations.

In one embodiment, a channel matrix associated with the wireless communication may be constant over each of one or more 1-millisecond (ms) sub-frame intervals of the wireless communication.

In one embodiment, one of the first and the second base stations may be associated with a macro-cell eNodeB while the other one of the first and the second base stations may be associated with a small-cell eNodeB.

In one embodiment, the method may further include attaching, by the communication device, to the first and the second base stations simultaneously.

In another aspect, a method may include receiving, by a communication device, wireless communication downlink signals from a first base station and a second base station. The method may also include generating equations for the received signals in terms of channel coefficients and inverse fast Fourier transform (IFFT) input reference signals. The method may further include cancelling interference of wireless downlink communications between the first base station and the communication device by the second base station.

In one embodiment, in generating the equations the method may include generating equations that orthogonalize the downlink signals from the first and the second base stations.

In one embodiment, in receiving the method may include receiving the wireless communication downlink signals in accordance with the LTE standard of a variation thereof. The communication device may include a MIMO communication device.

In one embodiment, a quantity of MIMO antennas of the communication device may equal a sum of a quantity of antennas of the first base station and a quantity of antennas of the second base station.

In one embodiment, in generating the equations the method may include calculating a MIMO equalizer solution using an MMSE method or a ZF method.

In one embodiment, in receiving the method may include attempting activation, by the communication device, in a first wireless network associated with the first base station when the communication device is in an area covered by a second wireless network associated with the second base station. A frequency spectrum used by the first wireless network and a frequency spectrum used by the second wireless network may be the same.

In one embodiment, the first base station and the second base station may be synchronized such that transmissions by the first and the second base stations occupy the same spectrum and that symbols from the first and the second base stations are approximately aligned to allow the communication device to receive signals from the first and the second base stations without inter-symbol interference over time.

In one embodiment, radio frames from the first and the second base stations may be aligned such that reference signals from the first and the second base stations overlap in same resource elements of a resource grid.

In one embodiment, the communication device may be aware of both the first base station and the second base station. The communication device may detect primary and secondary synchronization signals from the first and the second base stations.

In one embodiment, a channel matrix associated with the wireless communication may be constant over each of one or more 1-ms sub-frame intervals of the wireless communication.

In one embodiment, one of the first and the second base stations may be associated with a macro-cell eNodeB while the other one of the first and the second base stations may be associated with a small-cell eNodeB.

In one embodiment, the method may further include attaching, by the communication device, to the first and the second base stations simultaneously.

In yet another aspect, a device may include a first module and a second module coupled to the first module. The first module may be configured to receive wireless communication downlink signals from a first base station and a second base station in accordance with the LTE standard of a variation thereof. The second module may be configured to generate equations for the received signals in terms of channel coefficients and IFFT input reference signals, and cancel interference of wireless downlink communications between the first base station and the device by the second base station. One of the first and the second base stations may be associated with a macro-cell eNodeB, and the other one of the first and the second base stations may be associated with a small-cell eNodeB. A channel matrix associated with the wireless communication may be constant over each of one or more 1-ms sub-frame intervals of the wireless communication.

In one embodiment, the first module may include a plurality of antennas of a quantity that equals a sum of a quantity of antennas of the first base station and a quantity of antennas of the second base station.

In one embodiment, the second module may be configured to generate the equations using an MMSE method or a ZF method.

In one embodiment, a frequency spectrum used by a first wireless network associated with the first base station and a frequency spectrum used by a second wireless network associated with the second base station may be the same. The first base station and the second base station may be synchronized such that transmissions by the first and the second base stations occupy the same spectrum and that symbols from the first and the second base stations are approximately aligned to allow the first module to receive signals from the first and the second base stations without inter-symbol interference over time.

In one embodiment, radio frames from the first and the second base stations may be aligned such that reference signals from the first and the second base stations overlap in same resource elements of a resource grid.

In one embodiment, the second module may be configured to detect primary and secondary synchronization signals from the first and the second base stations.

This summary is provided to introduce techniques related to interference cancellation in wireless OFDMA with MIMO spatial multiplexing. Some embodiments of the technique are further described below in the detailed description. This summary is not intended to identify essential features of the claimed subject matter, nor is it intended for use in determining the scope of the claimed subject matter.

BRIEF DESCRIPTION OF THE DRAWINGS

The accompanying drawings are included to provide a further understanding of the disclosure, and are incorporated in and constitute a part of the present disclosure. The drawings illustrate embodiments of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF THE PREFERRED EMBODIMENTS

LTE

Figure 1A:
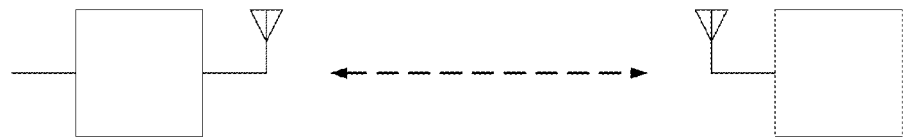
FIGS. 1A-1D are block diagrams showing examples of MIMO system configurations.
Figure 1B:
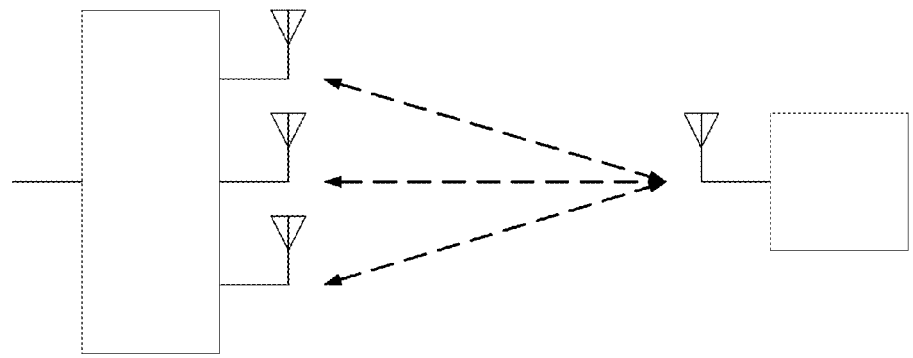
Figure 1C:
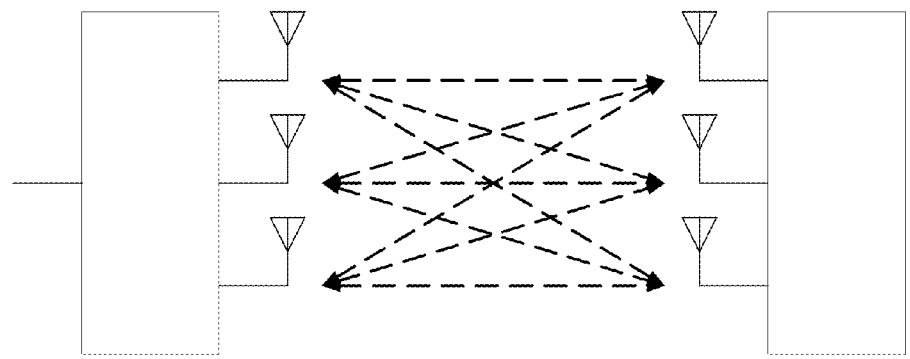
Figure 1D:
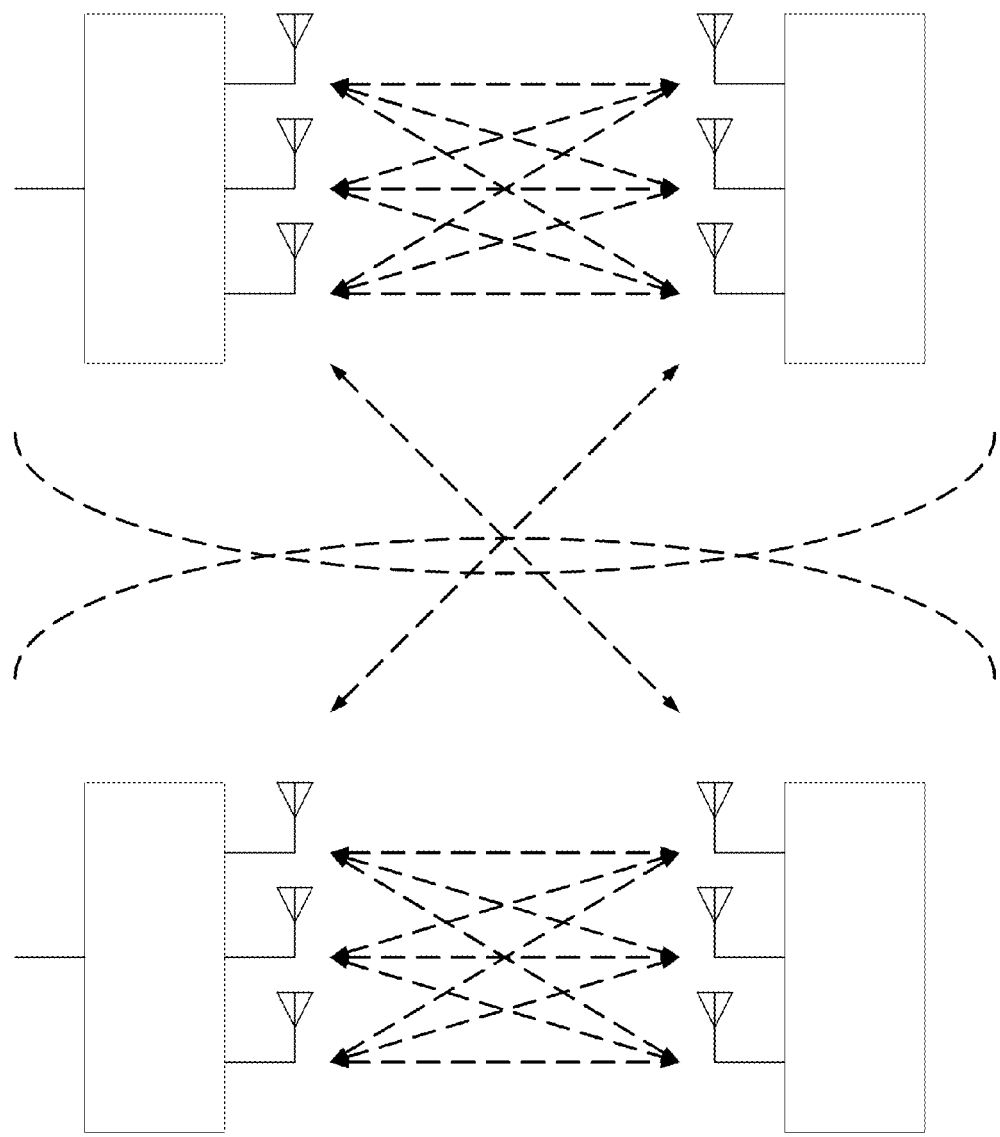
Figure 2:
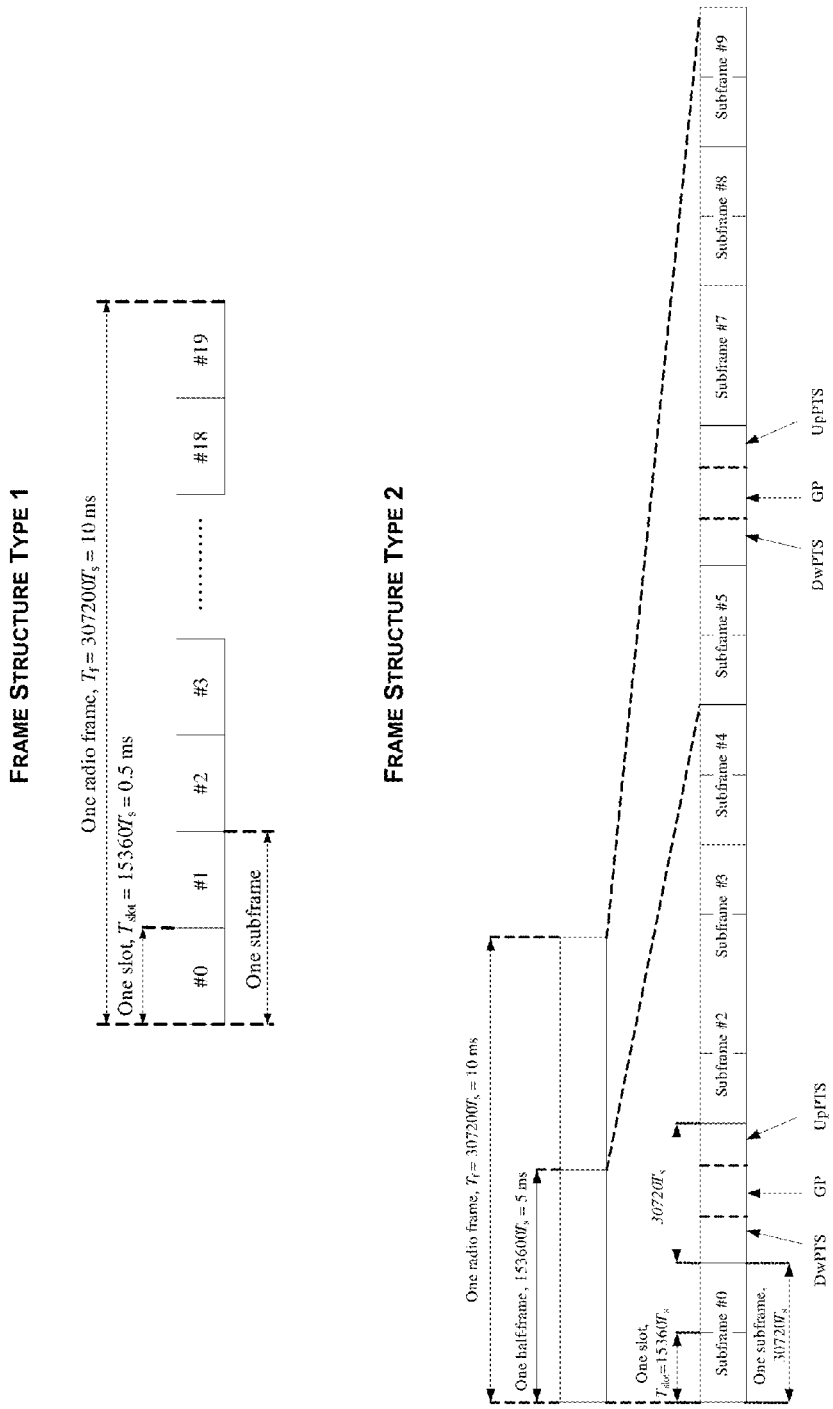
FIG. 2 is a diagram of two types of frame structures defined in the LTE-A standard.

Definition and structure of a LTE/LTE-A radio frame are as follows: (1) one radio frame=10 millisecond (ms), (2) one sub-frame=1 ms, (3) one slot=0.5 ms, (4) one radio frame=10 sub-frames=20 slots, (5) $T_s=10$ ms/307200=1/(15000*2048), and (6) sampling frequency=$1/T_s$=30.72 MHz. FIG. 2 illustrates example frame structure type 1 and example frame structure type 2.

Figure 3:
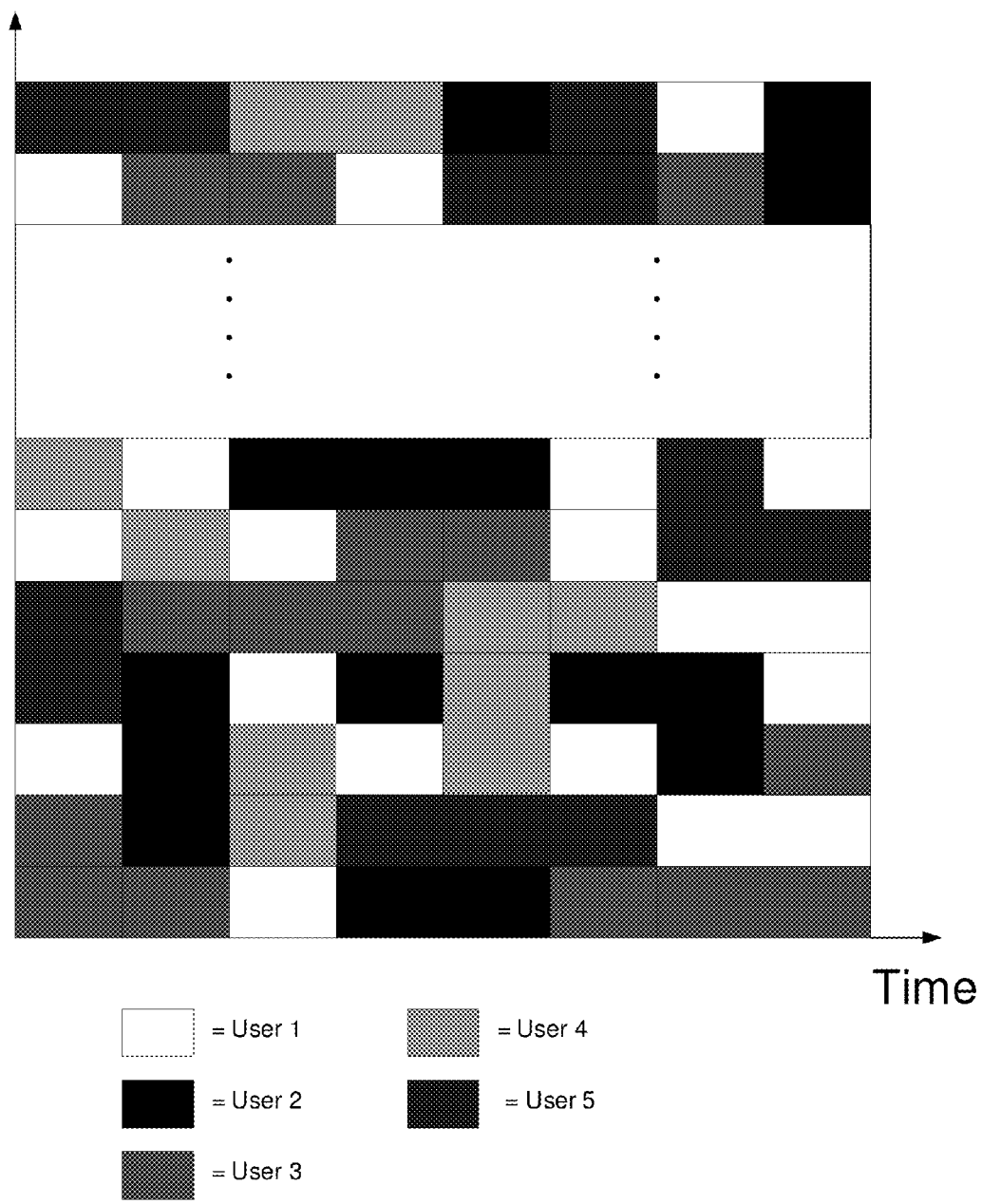
FIG. 3 is a diagram of an example of OFDMA resource allocation with five users sharing the downlink resource map.

With respect to baseband signal generation, the DL modulation scheme is OFDMA, whereas the UL modulation is a variation known as single carrier-OFDMA (SC-OFDMA) (DFT-spread OFDM). There are several different options for the size of the inverse fast Fourier transform (IFFT)/FFT used for modulation and demodulation, including 128, 256, 512, 1024, 2048, 4096 (7.5 kHz carrier spacing) points. FIG. 3 shows a simple example of OFDMA resource allocation with five users sharing the downlink resource map, subject to a proprietary scheduling algorithm in order to optimize resource usage.

Figure 4:
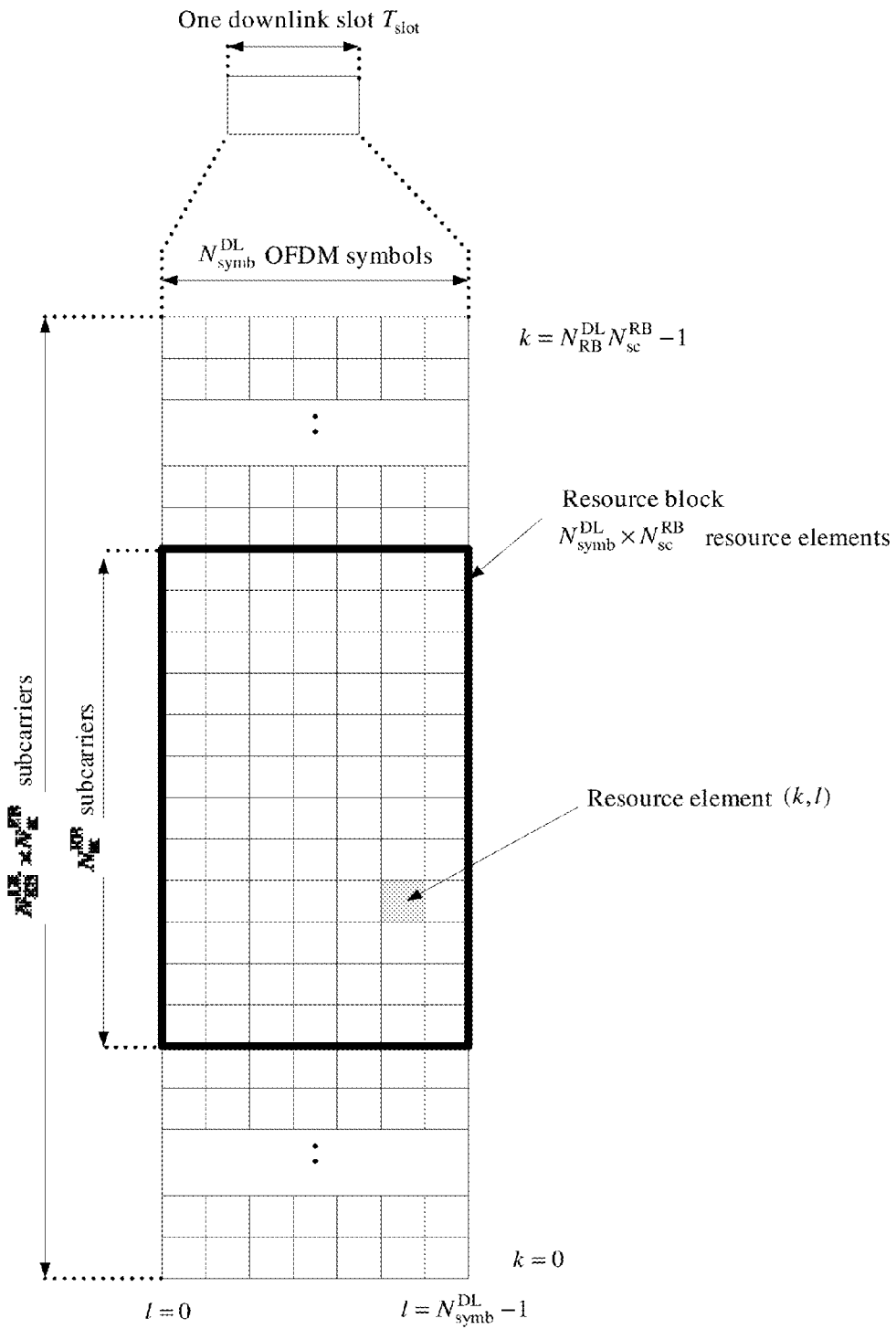
FIG. 4 shows a downlink resource grid defined in the LTE-A standard.

With respect to signal and resource structure, the resource grid for LTE is shown in FIG. 4. The vertical axis indicates carrier frequency and the horizontal axis indicates symbol number. A resource element (RE) represents one carrier frequency with one symbol duration. A resource block (RB) is typically an array of twelve carriers with duration of seven symbols (or one slot). The RB specification depends on the cyclic prefix selection. Table 1 below shows example downlink (DL) parameters for physical resource blocks. $N_{sc}^{RB}$ represents the number of subcarriers in one resource block. $N_{RB}^{DL}$ represents the number of resource blocks in the downlink channel spanning the available bandwidth.

TABLE 1

| Physical resource blocks parameters (DL) | | | |
| --- | --- | --- | --- |
| Configuration | | $N_{sc}^{RB}$ | $N_{symb}^{DL}$ |
| Normal cyclic prefix | Δf = 15 kHz | 12 | 7 |
| Extended cyclic prefix | Δf = 15 kHz | | 6 |
| | Δf = 7.5 kHz | 24 | 3 |

The DL resource grid is defined as $N_{RB}^{DL} N_{sc}^{RB}$ subcarriers and $N_{symb}^{DL}$ OFDM symbols. $N_{symb}^{DL}$ is the number of symbols in one downlink resource block.

$$N_{RB}^{min,DL} \le N_{RB}^{DL} \le N_{RB}^{max,DL}$$

where $N_{RB}^{min,DL}=6$ and $N_{RB}^{max,DL}=110$

Figure 5:
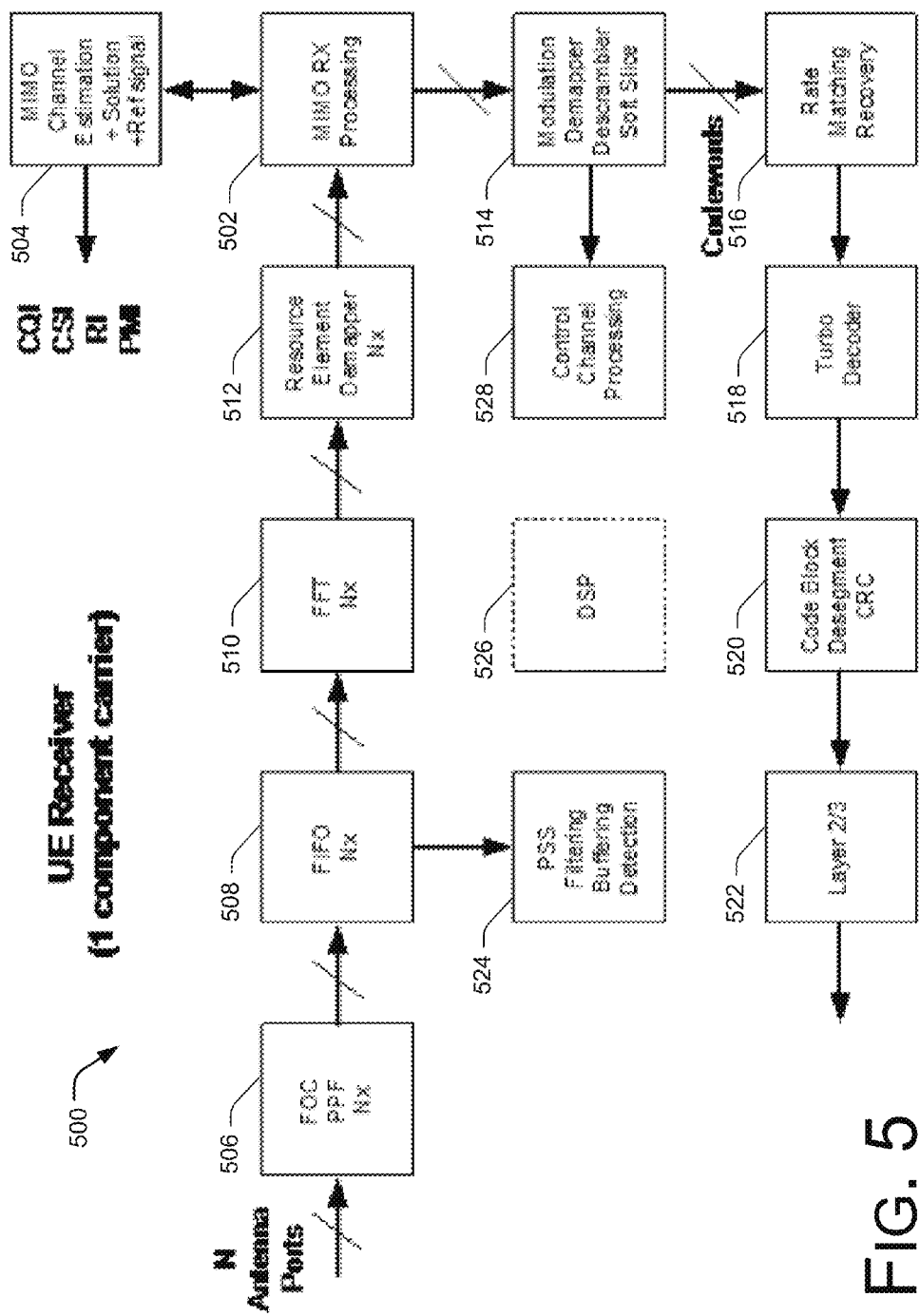
FIG. 5 is a block diagram of components a device capable of interference cancellation in wireless OFDMA with MIMO spatial multiplexing in accordance with an embodiment of the present disclosure.

FIG. 5 shows a block diagram of a device 500, e.g., UE receiver, that is capable of interference cancellation in wireless OFDMA with MIMO spatial multiplexing in accordance with the present disclosure, including implementation of processes 1000 and 1100 as well as any variation thereof. Device 500 may be a microprocessor, a custom semiconductor (e.g., application-specific integrated circuit, or ASIC), or a combination of the two, for example. Notably, not all of the functional blocks are described herein because the inventive concept described in the present disclosure does not depend on the function of those functional blocks.

The components of the device 500 depicted in FIG. 5 are for one component carrier. As the same design and operating principle described and depicted herein can be repeated and used for multiple component carriers, in the interest of brevity components for multiple component carriers will not be illustrated or described.

As shown in FIG. 5, the device 500 comprises a MIMO receiver processing module 502 and a MIMO channel estimation module 504. The MIMO channel estimation module 504 is configured to generate estimates of channel matrix elements with respect to C channels, where C is a positive integer greater than 1. The MIMO receiver processing module 502 is coupled to the MIMO channel estimation module 504. The MIMO receiver processing module 502 is configured to receive a first input that includes signals transmitted by M transmit antennas on the C channels and received by N receive antennas, where M and N is each a positive integer greater than 1. The MIMO receiver processing module 502 is also configured to receive, from the MIMO channel estimation module, a second input that includes the estimates of channel matrix elements with respect to C channels. The MIMO receiver processing module 502 is further configured to generate an output that includes at least an estimate of a transmit signal transmitted by one of the M transmit antennas on one of the C channels based at least in part on the first and the second inputs.

The MIMO channel estimation module 504 calculates the transmission channel matrix by using a number of reference signals that are embedded in the signal and resource structure. The reference signals are known to the receiver and are interspersed in both time and frequency. For each carrier, wherever the reference signals are located on the time/frequency/antenna resource grid, the signal on all other antenna ports corresponding to the same time and frequency position is set to zero to eliminate interference from the other antennas. By doing so, the transmission path from the active transmit antenna port to all the possible receive antenna ports can be calculated. This allows calculation of all of the possible channel matrix elements from each transmitter port to each receiver port corresponding to each base station, completing the channel matrix.

The device 500 may also comprise a frequency offset compensation (FOC) module 506, a first-in, first-out (FIFO) sample buffer 508, a fast Fourier transform (FFT) demodulator 510, a resource element demapper 512, a modulation demapping, descrambling and soft slicing module 514, a rate matching recovery module 516, a turbo decoder 518, a code block desegment cyclic redundancy check (CRC) module 520, a layer 5/3 processing module 522, a primary synchronization signal filtering, buffering and detection module 524.

The frequency offset compensation module 506 adjusts the sample timing of the receiver to match that of the far end transmitter. It does this by using a poly-phase filter with interpolated re-timing of the sampling process. It then branches to feed the primary synchronization signal filtering, buffering and detection module 524, which is a detection mechanism for the primary synchronization signal. The first-in, first-out (FIFO) sample buffer 508 is written with new samples as they are received, and the oldest samples are removed for further digital processing. Following the first-in, first-out (FIFO) sample buffer 508 is the fast Fourier transform demodulator 510. Multicarrier transmission schemes such as discrete multi-tone (DMT) and OFDM use the inverse FFT as the signal modulator and the FFT as the demodulator. Following the fast Fourier transform demodulator 510 is the resource element demapper 512, which extracts data from specific locations across time and frequency, as allocated by a high level resource management algorithm.

At this point the MIMO processing functionality, which is partially covered by the material in this application, is addressed. The output of the MIMO receiver processing module 502 is fed to the modulation demapping, descrambling and soft slicing module 514, which handles modulation demapping, descrambling, and soft slicing to prepare the signal for the rate matching recovery module 516 and turbo decoder 518. The modulation demapping, descrambling and soft slicing module 514 also provides an output to a control channel processing module 528. Layer 5/3 processing follows. The device 500 may further comprise a digital signal processor (DSP) 526 used to manage signal flow, hardware configuration, and simple calculations, and control channel processing machinery.

In at least some embodiments, the primary synchronization signal filtering, buffering and detection module 524 is configured to carry out techniques pertaining to primary synchronization signal detection in accordance of the present disclosure. For example, the primary synchronization signal filtering, buffering and detection module 524 may be configured to perform operations of process 100 as described above.

Figure 6:
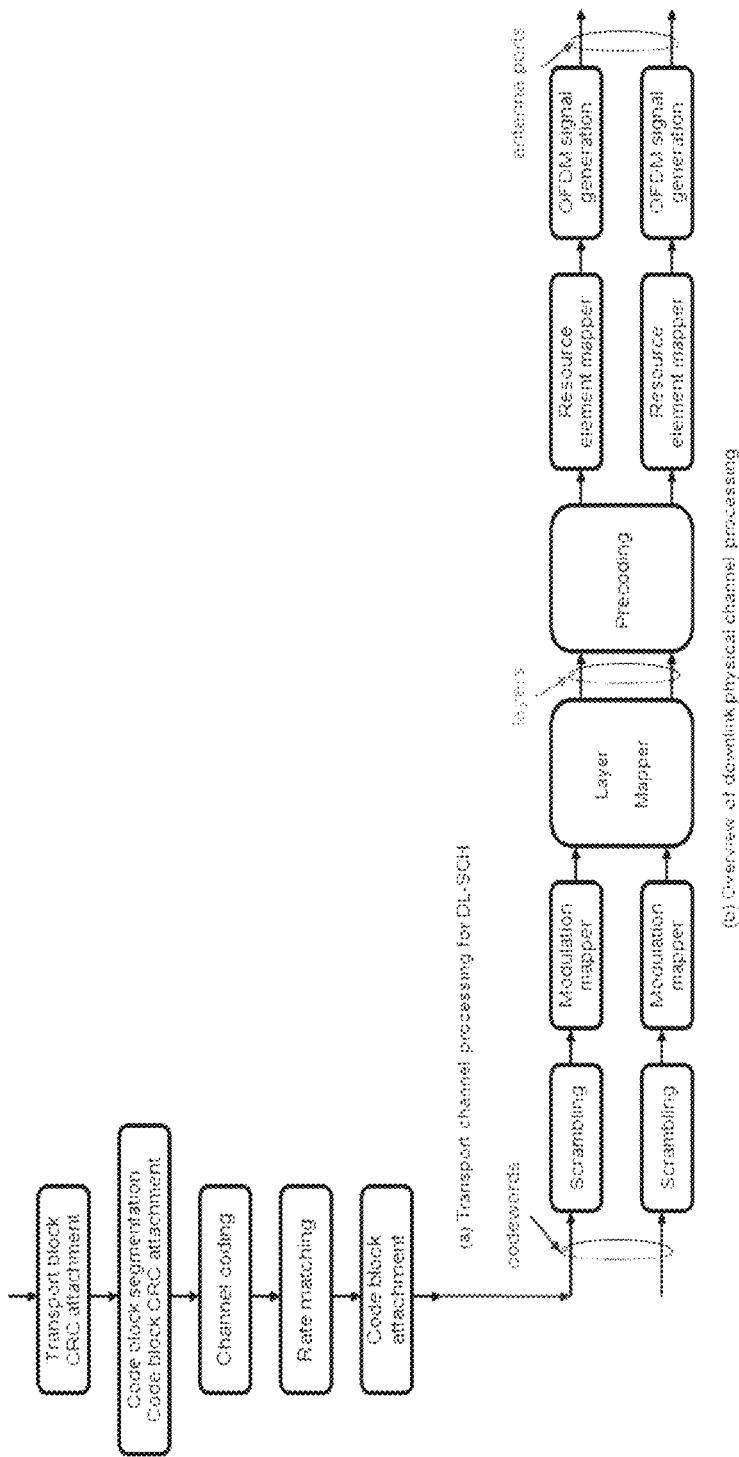
FIG. 6 is a block diagram of functionality of an eNodeB base station transmitter in accordance with an embodiment of the present disclosure.

Example functionality of the eNodeB base station transmitter is illustrated in FIG. 6. More specifically, FIG. 6 illustrates (a) an example transport channel processing for downlink shared channels (DL-SCH) and (b) an example overview of downlink physical channel processing. As shown in FIG. 6, example functional blocks for transport channel processing for downlink shared channels include the following: transport block CRC attachment, code block segmentation and code block CRC attachment, channel coding, rate matching, and code block attachment. Also as shown in FIG. 6, example functional blocks for downlink physical channel processing include the following: scrambling, modulation mapping, layer mapping, precoding, resource element mapping, and OFDM signal generation.

The LTE/LTE-A downlink cell-specific reference signals are interspersed throughout the resource grid depending on the number of transmit antennas. For the case corresponding to the normal cyclic prefix, they are placed in symbols 0 and 4 within each slot for one port and two port transmitters. With four antenna transmitters they are places in symbols 0, 1, and 4. Resource elements populated with reference signals on one antenna are left vacant on all other antennas for each base station transmission in order to facilitate channel matrix estimation. The reference signals are designed using a pseudo-random sequence that depends on the slot number, the symbol within a slot, and $N_{ID}^{cell}$.

The channel matrix elements corresponding to carrier frequencies between those containing reference signals are calculated using polar interpolation.

The reference-signal sequence $r_{l,n_s}(m)$ is defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 2N_{RB}^{max,DL} - 1$$

where $n_s$ is the slot number within a radio frame and l is the OFDM symbol number within the slot. The pseudo-random sequence c(i) is defined as follows. The pseudo-random sequence generator is initialized with the following expression:

$$c_{init}=2^{10} \cdot (7 \cdot (n_s+1)+l+1) \cdot (2 \cdot N_{ID}^{cell}+1)+2 \cdot N_{ID}^{cell}+N_{CP}$$

at the start of each OFDM symbol where $N_{ID}^{cell}$ is the cell ID acquired during synchronization and $$N_{CP} = \begin{cases} 1 & \text{for normal } CP \\ 0 & \text{for extended } CP \end{cases}.$$

Pseudo-random sequences are defined by a length-31 Gold sequence. The output sequence c(n) of length $M_{PN}$, where n=0, 1, ..., $M_{PN}$−1, is defined by:

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

where $N_C$=1600 and the first m-sequence is initialized with $x_1(0)=1$, $x_1(n)=0$, n=1, 2, ..., 30. The initialization of the second m-sequence is denoted by $c_{init}=\Sigma_{i=0}^{30}x_2(i)\cdot 2^i$ with the value depending on the application of the sequence.

The reference signal sequence $r_{l,n_s}(m)$ is mapped to complex-valued modulation symbols $a_{k,l}^{(p)}$ used as reference symbols for antenna port p in slot $n_s$ according to the following expression:

$$a_{k,l}^{(p)}=r_{l,n_s}(m')$$

where $$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

The variables v and $v_{shift}$ define the position in the frequency domain for the different reference signals where v is given by:

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

Figure 7:
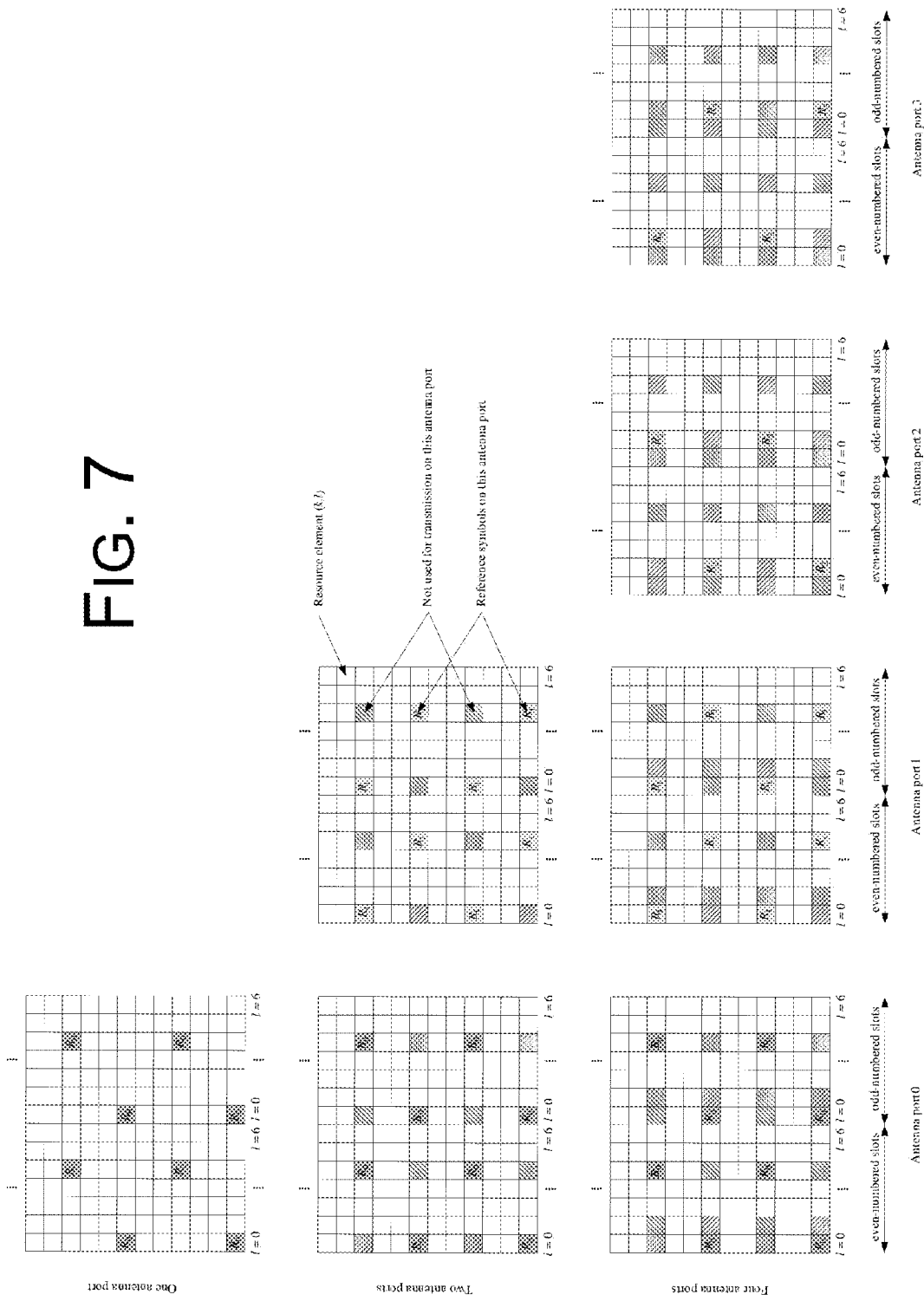
FIG. 7 is a diagram of mapping of downlink reference signals with normal cyclic prefix in accordance with an embodiment of the present disclosure.
Figure 8:
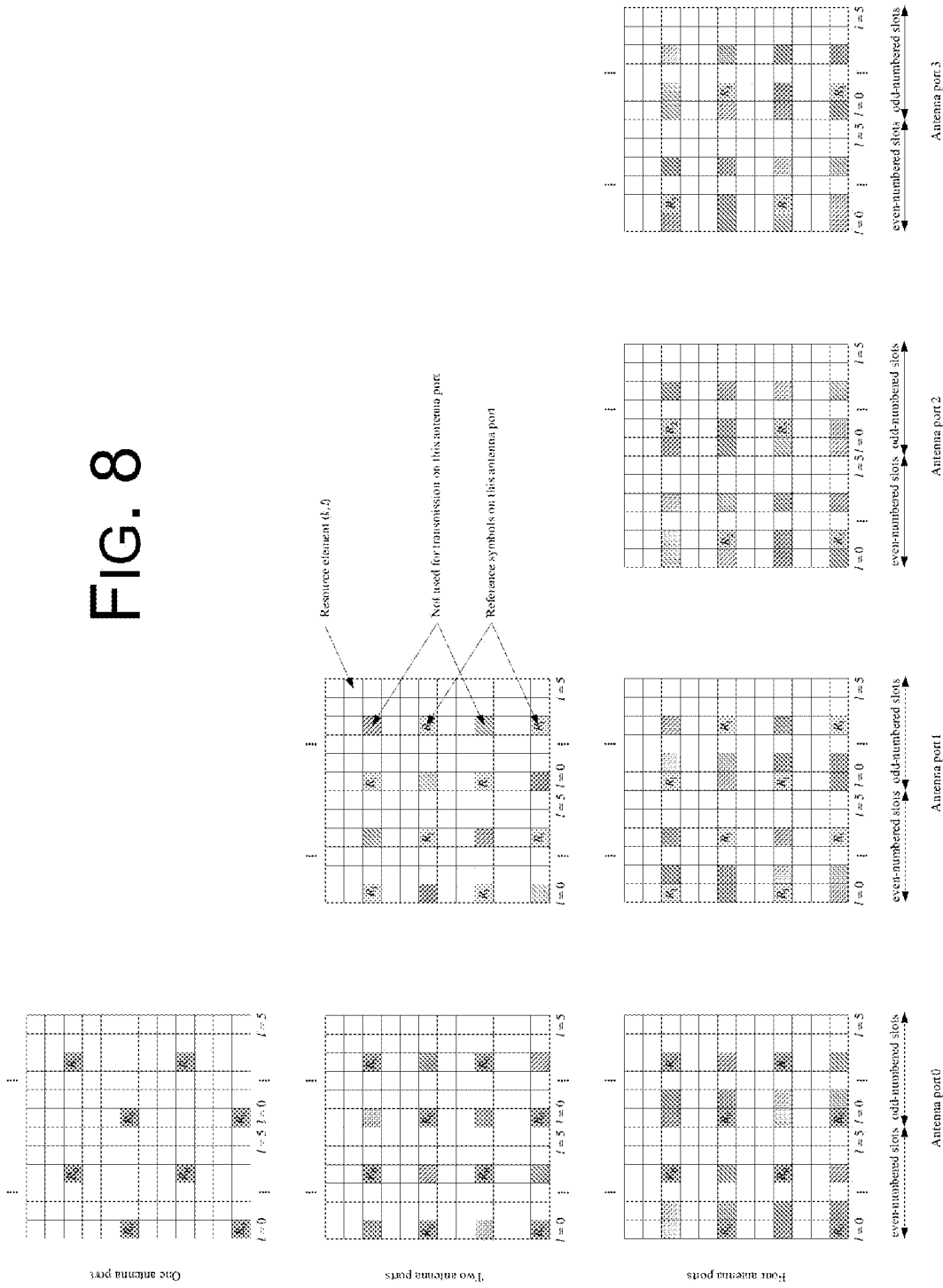
FIG. 8 is a diagram of mapping of downlink reference signals with extended cyclic prefix in accordance with an embodiment of the present disclosure.

The cell-specific frequency shift is given by $v_{shift} = N_{ID}^{cell}$ mod 6. Resource elements (k,l) used for transmission of cell-specific reference signals on any of the antenna ports in a slot is not used for any transmission on any other antenna port in the same slot and set to zero. FIGS. 7-8 illustrate the resource elements used for reference signal transmission according to the above definition. In particular, FIG. 7 illustrates mapping of downlink reference signals with normal cyclic prefix, and FIG. 8 illustrates mapping of downlink reference signals with extended cyclic prefix. The notation $R_p$ is used to denote a resource element used for reference signal transmission on antenna port p.

MIMO Communications Optimal Solution

Optimal multi-antenna formulation for spatial multiplexing includes the following conditions:
  Assumption that the duration of the time response of the channel is less than the cyclic prefix length (CP), and hence no inter-symbol interference (ISI);
  M transmit antennas; and
  N receive antennas.

$$r = Hy + n,$$

where:
  H=M×N MIMO channel response matrix
  r=received signal
  y=precoder output signal
  n=noise
  s=detected signal
  Channel diagonalization via singular value decomposition is expressed as follows:

$$H = SVD(H) = UDV^H$$

where U, V are unitary eigenvector matrices and D is a diagonal eigenvalue matrix.

$$r = UDV^H y + n$$

Assign y=Vx and $s = U^H r$ as the (modified) transmit and receive signals respectively (x is the precoder input signal):

$$s = U^H r = U^H UDV^H Vx + U^H n$$

$$s = Dx + U^H n$$

Since D is diagonal, the antenna channels are now orthogonalized and spatial interference is removed from the received signal s. The singular values are the square roots of the non-zero eigenvalues of $HH^H$ with rank≤min(M,N). Because U is unitary, the noise variance of the orthogonalized system is unchanged with no noise enhancement. Accordingly, optimal MIMO solution for spatial multiplexing is as follows: V=precoder, $U^H$=equalizer. Many standards-based MIMO schemes attempt to approximate the solution presented above. LTE uses limited feedback precoder selection with receiver (RX) equalization.

Overview

According to the scheme and techniques of the present disclosure, several assumptions are used in developing a downlink interference cancellation method. Firstly, it is assumed that the UE is to attempt activation in a small-cell network, and that the UE is in an area with a macro-cell coverage using the same frequency spectrum as does the small cell. Techniques of the scheme are also applicable to the case where the UE is activated with a macro-cell base station and interference stems from an adjacent macro cell. In such case, the UE is victim to interference from the macro cell.

Secondly, it is assumed that the macro-cell base station and the small-cell base station are synchronized such that their transmissions occupy the same spectrum and that the symbols from both are aligned in time within reasonable precision so that the UE is able to receive both signals individually without ISI over time. Radio frames from both base stations are also aligned such that the reference signals overlap in the same resource elements of the resource grid. Several methods are available to ensure this assumption is satisfied, including network synchronization and small-cell base station snooping for the macro-cell base station transmission signal.

Thirdly, it is assumed that the UE is aware of both base stations and has detected the primary and secondary synchronization signals. This enables the UE to detect the identifications of both cells, thus allowing the UE to calculate cell reference signals corresponding to both transmissions.

Lastly, it is assumed that the channel matrix is constant over any 1-ms sub-frame interval.

Techniques of the present disclosure utilize the MIMO spatial multiplexing system of both the victim link and the interfering link (also referred to as the hostile link) together to cancel the interference from the interfering macro cell (also referred to as hostile macro cell) along with the ordinary MIMO interference from the active downlink from the small cell to the UE. This is achieved by expanding the MIMO capability of the UE to increase the number of spatial channels and antennas to match the sum of the MIMO spatial channels of the macro-cell and the small-cell base stations (with the macro cell causing the interference). A MIMO equalizer solution then is calculated using one of several methods such as minimum mean square error (MMSE) or zero forcing (ZF) such that the combined MIMO spatial system including all the spatial channels from both base stations is orthogonalized. By doing so, all the interference is removed from each channel. Note that, however, only the active link channels from the small-cell are required in the equalizer solution, unless the receiver is intentionally designed to receive both signals. The channels corresponding to the base station spatial layers are otherwise not needed and thus are not calculated.

In order to use this method, channel matrix elements are required for all the paths from each transmitting antenna for both base stations to each receiving antenna at the UE. For example, if both the macro-cell base station and the small-cell base station operate with 4×4 MIMO spatial multiplexing in the downlink, then the UE needs to be configured with eight antennas. The UE also needs to have eight receiver signal paths from the eight antennas to the combined MIMO processor. This is the complexity cost of the interference cancellation method under consideration.

At first glance, the problem seems intractable because in order to calculate channel matrix element estimates it is necessary to have probing reference signals present on one antenna with the same resource elements on all other antennas quiet. This enables an interference-free condition, which allows direct calculation of the transmission path gain from one base station antenna to all the UE receiving antennas. However, since two base station transmissions occupy the same frequency spectrum and are perfectly aligned in time, this condition is not satisfied as there are two reference signals populating the same resource elements at the same time (one from each base station). This presents a mathematical problem which is under-determined because there are more unknown variables than equations. This issue is overcome by using the assumption that the channel matrix is constant over any 1-ms time interval. This time interval corresponds to one sub-frame. Additionally, it is noteworthy that there are two reference signal transmissions on the same carrier within this 1-ms window. For most cases there are two reference signal transmissions within a 0.5-ms window. This fact is exploited along with the knowledge that the reference signals change in a pseudo-random fashion from carrier to carrier and from symbol to symbol to obtain two independent equations with two unknown variables (channel gains from one antenna at each base station to one antenna at the UE on one carrier frequency) to assemble a 2×2 system of linear equations. This allows for the solution of the unknown channel matrix elements.

Figure 9:
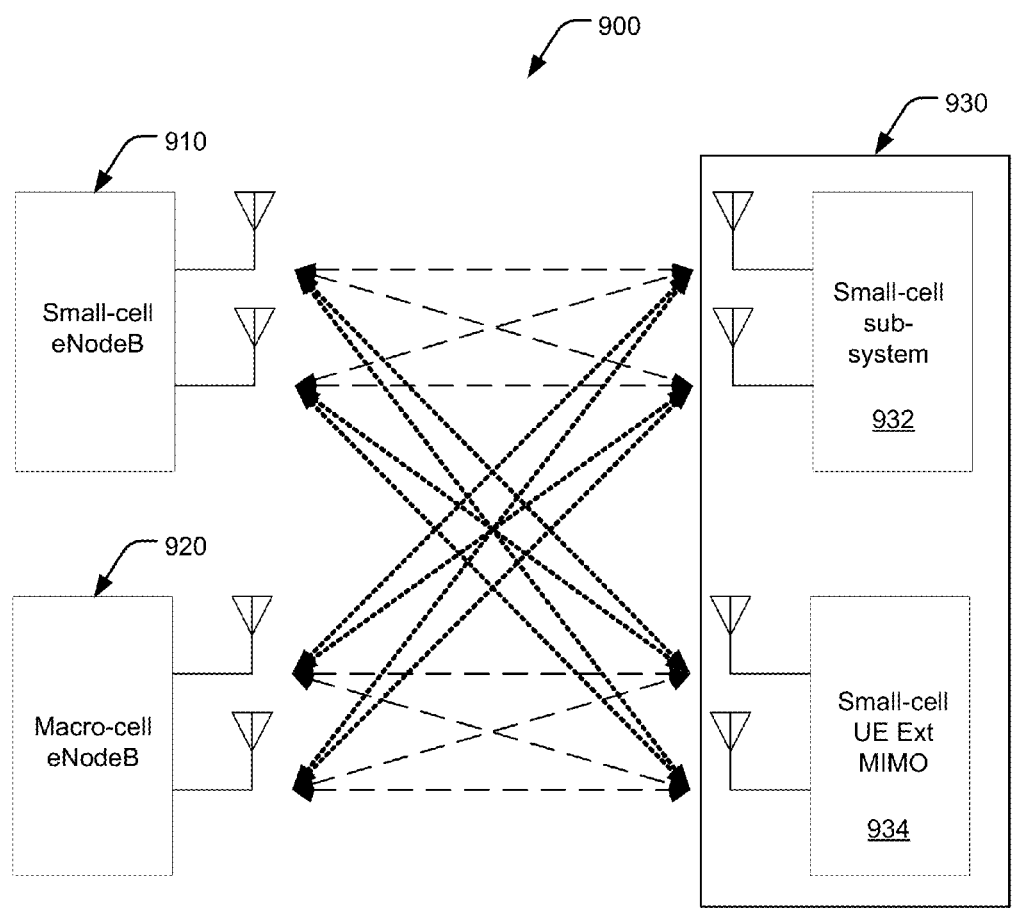
FIG. 9 is a diagram of an example scenario of a 2×2 small cell within proximity of a 2×2 macro-cell eNodeB in accordance with an embodiment of the present disclosure.

FIG. 9 illustrates an example scenario 900 of a 2×2 small cell within proximity of a 2×2 macro-cell eNodeB in accordance with an embodiment of the present disclosure. As shown in FIG. 9, a 2×2 small-cell eNodeB 910 and a 2×2 macro-cell eNodeB 920 are in communication with user equipment (UE) 930. In this example, each of small-cell eNodeB 910 and macro-cell eNodeB 920 has two antennas. UE 930 has four antennas, including a two-antenna subsystem 932 and a two-antenna system extension 934. The dashed lines in FIG. 9 indicate intra-cell MIMO paths, while the dotted lines indicate inter-cell cross paths between the small-cell eNodeB 910 and the macro-cell eNodeB 920.

According to the techniques of the present disclosure, the following variables are defined in the frequency domain. The transmit signals represent the IFFT input in the eNodeB. The receive signals represent the FFT output in the UE. The channel matrix variables represent the frequency domain transmission coefficient from the transmitter IFFT input to the receiver FFT output as follows:

- $t_{sc}^{k,l}(n)$=the small-cell transmit signal on carrier k, antenna n, and symbol l.
- $t_{mc}^{k,l}(n)$=the macro-cell transmit signal on carrier k, antenna n, and symbol l.
- $r_{sc}^{k,l}(n)$=the small-cell receive signal on carrier k, antenna n, and symbol l.
- $h_{sc}^{k,l}(n)$=the MIMO channel matrix transmission coefficient from the small-cell transmission antenna $n_1$, to the UE receiver antenna $n_2$, on carrier k and symbol l.
- $h_{mc}^{k,l}(n_1,n_2)$=the MIMO channel matrix transmission coefficient from the macro-cell transmission antenna $n_1$, to the UE receiver antenna $n_2$, on carrier k and symbol l.

Using the definitions above the following vectors are assembled:

$$T_{sc}^{k,l} = [t_{sc}^{k,l}(0) \ldots t_{sc}^{k,l}(N_{sc}-1)]^T$$

$$T_{mc}^{k,l} = [t_{mc}^{k,l}(0) \ldots t_{mc}^{k,l}(N_{mc}-1)]^T$$

$$R_{sc}^{k,l} = [r_{sc}^{k,l}(0) \ldots r_{sc}^{k,l}(N_{sc}-1) r_{sc}^{k,l}(N_{sc}) \ldots r_{sc}^{k,l}(N_{sc}+N_{mc}-1)]^T$$

where $N_{sc}$ is the number of small-cell transmitting antennas and $N_{mc}$ is the number of macro-cell transmitting antennas. The combined vector is as follows:

$$T^{k,l} = \begin{bmatrix} T_{sc}^{k,l} \\ T_{mc}^{k,l} \end{bmatrix}$$

The MIMO channel matrix is defined as follows:

$$H_{sc}^{k,l} = \begin{bmatrix} h_{sc}^{k,l}(0,0) & \ldots & h_{sc}^{k,l}(N_{sc}-1,0) \\ h_{sc}^{k,l}(0,N_{sc}-1) & \ldots & h_{sc}^{k,l}(N_{sc}-1,N_{sc}-1) \end{bmatrix}$$

$$H_{mc}^{k,l} = \begin{bmatrix} h_{mc}^{k,l}(0,0) & \ldots & h_{mc}^{k,l}(N_{mc}-1,0) \\ h_{mc}^{k,l}(0,N_{mc}-1) & \ldots & h_{mc}^{k,l}(N_{mc}-1,N_{mc}-1) \end{bmatrix}$$

$$H^{k,l} = [H_{sc}^{k,l} H_{mc}^{k,l}]$$

The MIMO system equation including the interference paths from the macro cell is as follows:

$$R_{sc}^{k,l} = H^{k,l} * T^{k,l}$$

There exist methods for generating the receiver MIMO equalizer, such as a ZF solution or a MMSE solution. Those solutions are listed below for completeness:

1) Zero Forcing solution: $W = (H^{k,l^H} H^{k,l})^{-1} H^{k,l^H}$

2) MMSE solution: $W = (H^{k,l^H} H^{k,l} + I/SNR)^{-1} H^{k,l^H}$ where I is the identity matrix and SNR is the signal-to-noise ratio of the channel.

In order to apply this scheme the channel matrix coefficient estimates are required for all the transmission paths from each transmitter (TX) antenna to each receiver (RX) antenna. As mentioned earlier, it is possible to write equations for them by considering two adjacent reference signal appearances in the downlink resource grid. Since all other interfering transmission from both the small cell and macro cell are quiet, the received signals at symbols $l_1$ and $l_2$ are as follows:

$$r_{sc}^{k,l_1}(n_2) = k_{sc}^{k,l}(n_1,n_2) * t_{sc}^{k,l_1}(n_1) + t_{mc}^{k,l}(n_1,n_2) * t_{mc}^{k,l_1}(n_1)$$

$$r_{sc}^{k,l_2}(n_2) = k_{sc}^{k,l}(n_1,n_2) * t_{sc}^{k,l_2}(n_1) + t_{mc}^{k,l}(n_1,n_2) * t_{mc}^{k,l_2}(n_1)$$

A pair of equations are generated for each RX antenna indicated by the variable n at the UE. With two unknown variables and two equations, the system solution exists as long as the rank of the system equals two, or equivalently as long as the determinant of the system matrix is not zero.

$$\begin{bmatrix} r_{sc}^{k,l_1}(n_2) \\ r_{mc}^{k,l_2}(n_2) \end{bmatrix} = \begin{bmatrix} t_{sc}^{k,l_1}(n_1) & t_{mc}^{k,l_1}(n_1) \\ t_{sc}^{k,l_2}(n_1) & t_{mc}^{k,l_2}(n_1) \end{bmatrix} \begin{bmatrix} h_{sc}^{k,l}(n_1,n_2) \\ h_{mc}^{k,l}(n_1,n_2) \end{bmatrix}$$

The solution is as follows:

$$\begin{bmatrix} h_{sc}^{k,l}(n_1, n_2) \\ h_{mc}^{k,l}(n_1, n_2) \end{bmatrix} = \begin{bmatrix} t_{sc}^{k,l_1}(n_1) & t_{mc}^{k,l_1}(n_1) \\ t_{sc}^{k,l_2}(n_1) & t_{mc}^{k,l_2}(n_1) \end{bmatrix}^{-1} \begin{bmatrix} r_{sc}^{k,l_1}(n_2) \\ r_{mc}^{k,l_2}(n_2) \end{bmatrix}$$

In a similar fashion, all the propagation path solutions are calculated for each RX antenna from each TX antenna at both the small-cell eNodeB and the macro-cell eNodeB. One system of equations is generated for each RX antenna at each transmit reference signal resource element on both cell's resource grid.

If the LTE reference signals generate a singular system matrix, in most cases the designer can just wait for one of the subsequent reference signals. Considering the radio frame structure, there are four reference signals per reference carrier on all antenna configurations except on antennas 3 and 4 in the 4×4 MIMO configuration. In the event that reference signals over a 1-ms period do not generate a nonsingular system matrix, either of two techniques may be utilized: 1) extend the assumption of a stationary channel matrix for a slightly longer period of time, or 2) skip the calculation at that point for the carrier/antenna combination and use polar interpolation to calculate the channel coefficient from neighboring coefficients. The latter technique is used anyway for most of the channel coefficients because of the sparse placement of reference signals in the resource grid.

One method for ensuring that the small cell and macro cell base stations are properly time-, symbol-, and frame-synchronized is to design the small-cell eNodeB to snoop on the macro-cell downlink signal. Using existing standard methods, the small cell can match its transmit signal characteristics to those from the macro cell. Another method would involve network level synchronization.

Example Process

Figure 10:
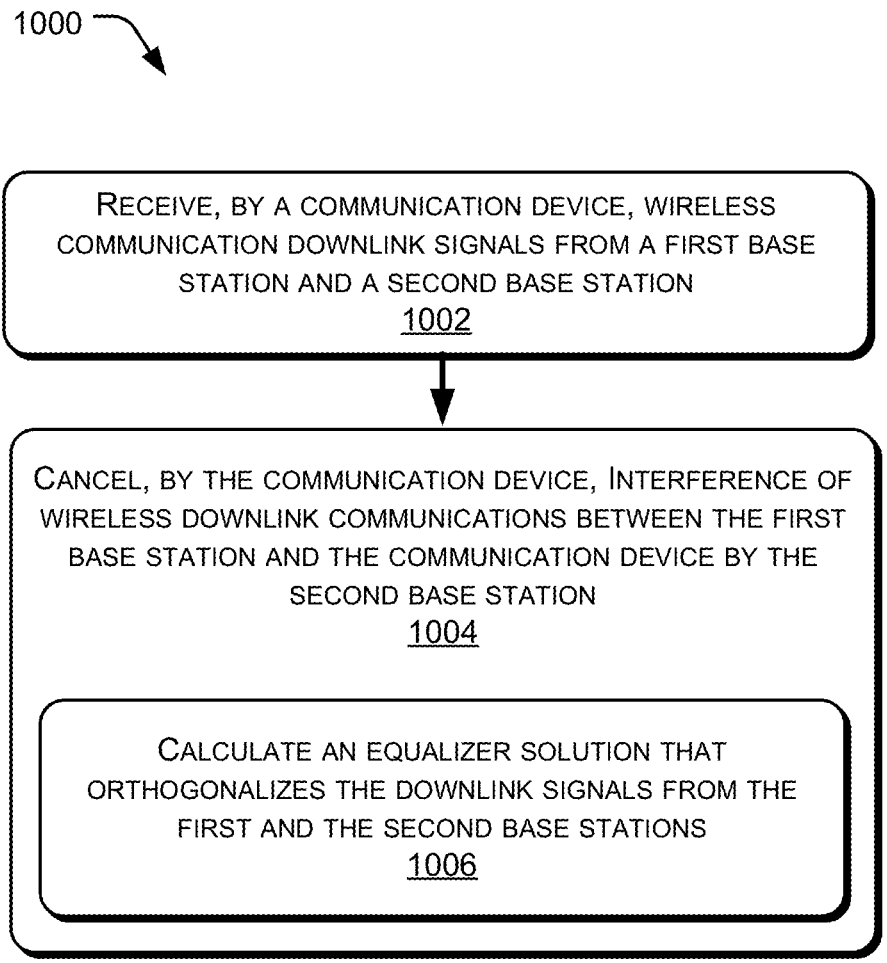
FIG. 10 is a flowchart of a process of interference cancellation in wireless OFDMA with MIMO spatial multiplexing in accordance with an embodiment of the present disclosure.

FIG. 10 illustrates a process 1000 of interference cancellation in wireless OFDMA with MIMO spatial multiplexing in accordance with an embodiment of the present disclosure.

Example process 1000 includes one or more operations, actions, or functions as illustrated by one or more of blocks 1002 and 1004. Although illustrated as discrete blocks, various blocks may be divided into additional blocks, combined into fewer blocks, or eliminated, depending on the desired implementation. Further, process 1000 may be implemented by software, hardware, or a combination of software and hardware in any type of computing device, such as user equipment 930, communication device 1200 and example computing device 1300 that are described below.

At 1002, a communication device receives wireless communication downlink signals from a first base station and a second base station. For example, as shown in FIG. 9, UE 930 receives wireless communication downlink signals from small-cell eNodeB 910 and macro-cell eNodeB 920.

At 1004, the communication device cancels interference of wireless downlink communications between the first base station and the communication device by the second base station. The cancelling may include calculating, by the communication device, an equalizer solution that orthogonalizes the downlink signals from the first and the second base stations. For example, UE 930 may cancel interference of wireless downlink communications between small-cell eNodeB 910 and UE 930 caused by macro-cell eNodeB 920 by calculating an equalizer solution, e.g., a set of equations, that orthogonalizes the downlink signals from small-cell eNodeB 910 and macro-cell eNodeB 920.

In one embodiment, the receiving may include receiving the wireless communication downlink signals in accordance with the LTE standard of a variation thereof. For example, UE 930 may receive the wireless communication downlink signals in accordance with the LTE standard of a variation thereof, e.g., LTE-Advance or the like.

In one embodiment, the communication device may include a MIMO communication device. For example, UE 930 may be a MIMO communication device as shown in FIG. 9.

In one embodiment, a quantity of MIMO spatial channels of the communication device equals a sum of a quantity of MIMO spatial channels of the first base station and a quantity of MIMO spatial channels of the second base station. For example, as shown in FIG. 9, the quantity of antennas of UE 930, which is four, equals the sum of the quantity of the antennas of small-cell eNodeB 910, which is two, and the quantity of the antennas of macro-cell eNodeB 920, which is two.

In one embodiment, in calculating the equalizer solution the method may include calculating a MIMO equalizer solution using a minimum mean square error (MMSE) method or a zero forcing (ZF) method. For example, UE 930 may calculate a MIMO equalizer solution using MMSE or ZF.

In one embodiment, in receiving the method may include attempting activation, by the communication device, in a first wireless network associated with the first base station when the communication device is in an area covered by a second wireless network associated with the second base station. A frequency spectrum used by the first wireless network and a frequency spectrum used by the second wireless network may be the same. For example, UE 930 may attempt activation in a small cell associated with small-cell eNodeB 910 when UE 930 is within coverage of a macro cell associated with macro-cell eNodeB 920, with small-cell eNodeB 910 and macro-cell eNodeB 920 synchronized in frequency spectrum.

In one embodiment, the first base station and the second base station may be synchronized such that transmissions by the first and the second base stations occupy the same spectrum and that symbols from the first and the second base stations are approximately aligned to allow the communication device to receive signals from the first and the second base stations without inter-symbol interference over time.

In one embodiment, radio frames from the first and the second base stations may be aligned such that reference signals from the first and the second base stations overlap in same resource elements of a resource grid.

In one embodiment, the communication device may be aware of both the first base station and the second base station. The communication device may detect primary and secondary synchronization signals from the first and the second base stations. For example, UE 930 may be aware of the existence of both small-cell eNodeB 910 and macro-cell eNodeB 920, and may detect primary and secondary synchronization signals from small-cell eNodeB 910 and macro-cell eNodeB 920.

In one embodiment, a channel matrix associated with the wireless communication may be constant over each of one or more 1-millisecond (ms) sub-frame intervals of the wireless communication.

In one embodiment, one of the first and the second base stations may be associated with a macro-cell eNodeB while the other one of the first and the second base stations may be associated with a small-cell eNodeB.

In one embodiment, the method may further include attaching, by the communication device, to the first and the second base stations simultaneously. For example, UE 930 may attach itself to both small-cell eNodeB 910 and macro-cell eNodeB 920 simultaneously.

Figure 11:
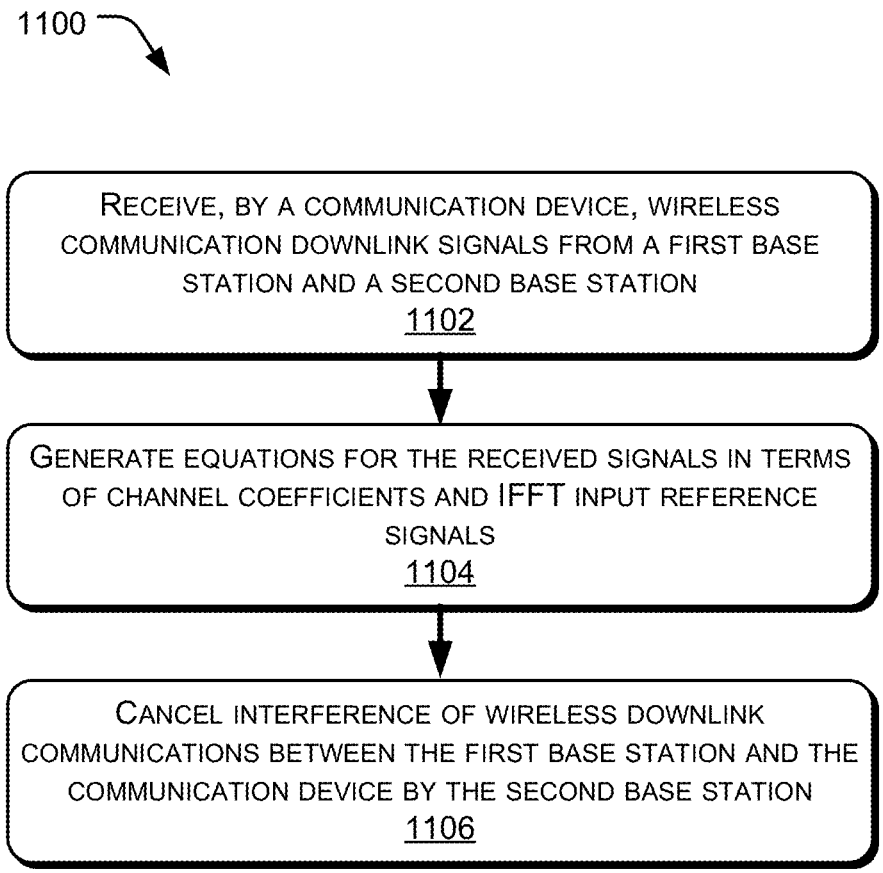
FIG. 11 is a flowchart of a process of interference cancellation in wireless OFDMA with MIMO spatial multiplexing in accordance with another embodiment of the present disclosure.

FIG. 11 illustrates a process 1100 of interference cancellation in wireless OFDMA with MIMO spatial multiplexing in accordance with another embodiment of the present disclosure.

Example process 1100 includes one or more operations, actions, or functions as illustrated by one or more of blocks 1102, 1104 and 1106. Although illustrated as discrete blocks, various blocks may be divided into additional blocks, combined into fewer blocks, or eliminated, depending on the desired implementation. Further, process 1100 may be implemented by software, hardware, or a combination of software and hardware in any type of computing device, such as user equipment 930, communication device 1200 and example computing device 1300 that are described below.

At 1102, a communication device may receive wireless communication downlink signals from a first base station and a second base station. For example, UE 930 may receive wireless communication downlink signals from small-cell eNodeB 910 and macro-cell eNodeB 920.

At 1104, the communication device may generate equations for the received signals in terms of channel coefficients and IFFT input reference signals. For example, UE 930 may generate equations for the received signals in terms of channel coefficients and IFFT input reference signals.

At 1106, the communication device may cancel interference of wireless downlink communications between the first base station and the communication device by the second base station. For example, UE 930 may cancel interference of wireless downlink communications between small-cell eNodeB 910 and UE 930 caused by macro-cell eNodeB 920.

In one embodiment, in generating the equations the method may include generating equations that orthogonalize the downlink signals from the first and the second base stations. For example, UE 930 may generate equations that orthogonalize the downlink signals from small-cell eNodeB 910 and macro-cell eNodeB 920.

In one embodiment, in receiving the method may include receiving the wireless communication downlink signals in accordance with the LTE standard of a variation thereof. The communication device may include a MIMO communication device. For example, UE 930 may be a MIMO communication device, as shown in FIG. 9, and may receive the wireless communication downlink signals in accordance with the LTE standard of a variation thereof, e.g., LTE-Advanced.

In one embodiment, a quantity of MIMO antennas of the communication device may equal a sum of a quantity of antennas of the first base station and a quantity of antennas of the second base station. For example, as shown in FIG. 9, the quantity of antennas of UE 930, which is four, equals the sum of the quantity of the antennas of small-cell eNodeB 910, which is two, and the quantity of the antennas of macro-cell eNodeB 920, which is two.

In one embodiment, in generating the equations the method may include calculating a MIMO equalizer solution using an MMSE method or a ZF method. For example, UE 930 may calculate a MIMO equalizer solution using an MMSE method or a ZF method.

In one embodiment, in receiving the method may include attempting activation, by the communication device, in a first wireless network associated with the first base station when the communication device is in an area covered by a second wireless network associated with the second base station. A frequency spectrum used by the first wireless network and a frequency spectrum used by the second wireless network may be the same. For example, UE 930 may attempt activation in a small cell associated with small-cell eNodeB 910 when UE 930 is within coverage of a macro cell associated with macro-cell eNodeB 920, with small-cell eNodeB 910 and macro-cell eNodeB 920 synchronized in frequency spectrum.

In one embodiment, the first base station and the second base station may be synchronized such that transmissions by the first and the second base stations occupy the same spectrum and that symbols from the first and the second base stations are approximately aligned to allow the communication device to receive signals from the first and the second base stations without inter-symbol interference over time.

In one embodiment, radio frames from the first and the second base stations may be aligned such that reference signals from the first and the second base stations overlap in same resource elements of a resource grid.

In one embodiment, the communication device may be aware of both the first base station and the second base station. The communication device may detect primary and secondary synchronization signals from the first and the second base stations. For example, UE 930 may be aware of the existence of both small-cell eNodeB 910 and macro-cell eNodeB 920, and may detect primary and secondary synchronization signals from small-cell eNodeB 910 and macro-cell eNodeB 920.

In one embodiment, a channel matrix associated with the wireless communication may be constant over each of one or more 1-ms sub-frame intervals of the wireless communication.

In one embodiment, one of the first and the second base stations may be associated with a macro-cell eNodeB while the other one of the first and the second base stations may be associated with a small-cell eNodeB.

In one embodiment, the method may further include attaching, by the communication device, to the first and the second base stations simultaneously. For example, UE 930 may attach itself to both small-cell eNodeB 910 and macro-cell eNodeB 920 simultaneously.

Figure 13:
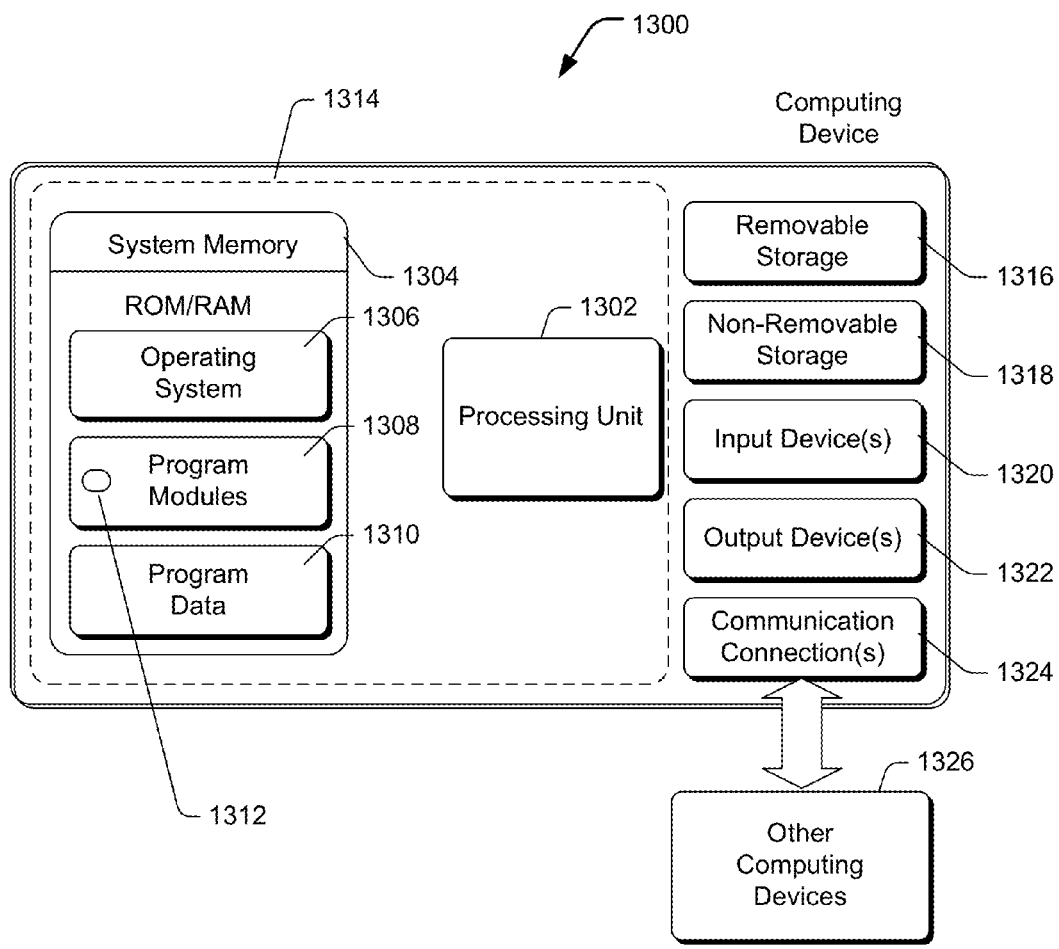
FIG. 13 is a block diagram of a computing device capable of implementing interference cancellation in wireless OFDMA with MIMO spatial multiplexing in accordance with an embodiment of the present disclosure.

Processes 1000 and 1100, as well as any variations thereof, may be carried out as a result of executing computer-executable instructions, e.g., computer programming codes, stored on one or more non-transitory computer-readable medium, herein interchangeably referred to as computer-readable storage medium, by a processor, a central processing unit, a computing device such as, for example, computing device 1300 of FIG. 13. Such one or more computer-readable medium may be one or more tangible storage device including, but not limited to, random access memory (RAM), read-only memory (ROM), electrically erasable programmable read-only memory (EEPROM), flash memory or other memory technology, compact disc read-only memory (CD-ROM), digital versatile disks (DVD), any optical storage, magnetic cassettes, magnetic tape, magnetic disk storage or other magnetic storage devices, or any other non-transitory medium which can be used to store the desired information now known or later developed and which can be accessed by a processor, a central processing unit, a computing device such as, for example, computing device 1300 of FIG. 13. In the present disclosure, the term "one or more computer-readable medium" does not encompass any non-tangible or transitory propagating signal such as, for example, electromagnetic or acoustic signal or waveform and shall not be interpreted as such.

Example Communication Device

Figure 12:
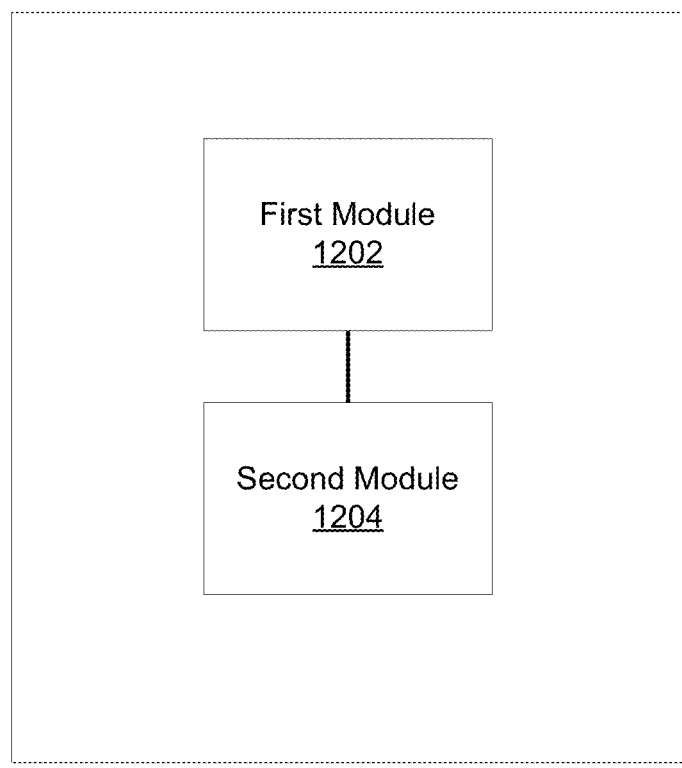
FIG. 12 is a block diagram of functional blocks of a device capable of implementing interference cancellation in wireless OFDMA with MIMO spatial multiplexing in accordance with an embodiment of the present disclosure.

FIG. 12 illustrates a communication device 1200, or a functional block of a processor, capable of implementing interference cancellation in wireless OFDMA with MIMO spatial multiplexing in accordance with the present disclosure. Communication device 1200 may be implemented as, for example, a single microprocessor, multiple microprocessors, a chip set, etc. Alternatively, communication device 1200 may be a functional block of a microprocessor or a functional block of user equipment, e.g., user equipment 930 of FIG. 9.

Communication device 1200 includes a first module 1202 and a second module 1204. The first module 1202 is configured to receive wireless communication downlink signals from a first base station and a second base station in accordance with the LTE standard of a variation thereof. The second module 1204 is configured to generate equations for the received signals in terms of channel coefficients and IFFT input reference signals, and cancel interference of wireless downlink communications between the first base station and the device by the second base station. One of the first and the second base stations may be associated with a macro-cell eNodeB, and the other one of the first and the second base stations may be associated with a small-cell eNodeB. A channel matrix associated with the wireless communication may be constant over each of one or more 1-ms sub-frame intervals of the wireless communication.

In one embodiment, the first module 1202 may include a plurality of antennas of a quantity that equals a sum of a quantity of antennas of the first base station and a quantity of antennas of the second base station.

In one embodiment, the second module 1204 may be configured to generate the equations using an MMSE method or a ZF method.

In one embodiment, a frequency spectrum used by a first wireless network associated with the first base station and a frequency spectrum used by a second wireless network associated with the second base station may be the same. The first base station and the second base station may be synchronized such that transmissions by the first and the second base stations occupy the same spectrum and that symbols from the first and the second base stations are approximately aligned to allow the first module to receive signals from the first and the second base stations without inter-symbol interference over time.

In one embodiment, radio frames from the first and the second base stations may be aligned such that reference signals from the first and the second base stations overlap in same resource elements of a resource grid.

In one embodiment, the second module 1204 may be configured to detect primary and secondary synchronization signals from the first and the second base stations.

Example Computing Device

FIG. 1300 illustrates a representative computing device 1300 that may implement the transmit diversity decoding scheme in accordance with an embodiment of the present disclosure. However, it will be readily appreciated that the techniques disclosed herein may be implemented in other computing devices, systems, and environments. The computing device 1300 shown in FIG. 13 is only one example of a computing device and is not intended to suggest any limitation as to the scope of use or functionality of the computer and network architectures.

In at least one configuration, computing device 1300 typically includes at least one processing unit 1302 and system memory 1304. Depending on the exact configuration and type of computing device, system memory 1304 may be volatile (such as RAM), nonvolatile (such as ROM, flash memory, etc.) or some combination thereof. System memory 1304 may include an operating system 1306, one or more program modules 1308, and may include program data 1310. The computing device 1300 is of a very basic configuration demarcated by a dashed line 1314. Again, a terminal may have fewer components but may interact with a computing device that may have such a basic configuration.

In one embodiment, the program module 1308 includes an interference cancellation module 1312. The interference cancellation module 1312 can carry out one or more functionalities and processes as described above with reference to FIGS. 10 and 11. For example, when the interference cancellation module 1312 is properly configured, the computing device 1300 can carry out the operations of processes 1000 and 1100 as well as variations thereof.

Computing device 1300 may have additional features or functionality. For example, computing device 1300 may also include additional data storage devices (removable and/or non-removable) such as, for example, magnetic disks, optical disks, or tape. Such additional storage is illustrated in FIG. 13 by removable storage 1316 and non-removable storage 1318. Computer-readable storage media may include volatile and nonvolatile, removable and non-removable media implemented in any method or technology for storage of information, such as computer-executable instructions, data structures, program modules, or other data. System memory 1304, removable storage 1316 and non-removable storage 1318 are all examples of computer storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1300. Any such computer storage media may be part of the computing device 1300. Computing device 1300 may also have input device(s) 1320 such as keyboard, mouse, pen, voice input device, touch input device, etc. Output device(s) 1322 such as a display, speakers, printer, etc. may also be included.

Computing device 1300 may also contain communication connections 1324 that allow the device to communicate with other computing devices 1326, such as over a network. These networks may include wired networks as well as wireless networks. Communication connections 1324 are some examples of communication media. Communication media may typically be embodied by computer readable instructions, data structures, program modules, etc.

It is appreciated that the illustrated computing device 1300 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, and/or the like.

ADDITIONAL AND ALTERNATIVE IMPLEMENTATION NOTES

The above-described techniques pertain to primary synchronization signal detection. Although the techniques have been described in language specific to structural features and/or methodological acts, it is to be understood that the appended claims are not necessarily limited to the specific features or acts described. Rather, the specific features and acts are disclosed as example forms of implementing such techniques. Those skilled in the art may make derivations and/or modifications of any of the disclosed embodiments or any variations thereof, and such derivations and modifications are still within the scope of the present disclosure.

In the above description of example implementations, for purposes of explanation, specific numbers, materials configurations, and other details are set forth in order to better explain the invention, as claimed. However, it will be apparent to one skilled in the art that the claimed invention may be practiced using different details than the example ones described herein. In other instances, well-known features are omitted or simplified to clarify the description of the example implementations.

The inventors intend the described embodiments to be primarily examples. The inventors do not intend these embodiments to limit the scope of the appended claims. Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, systems, methods, articles of manufacture, and/or computer-readable instructions as indicated by the context described herein.

As used in the present disclosure, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. A method, comprising:
    receiving, by a communication device, wireless communication downlink signals from a first base station and a second base station; and
    cancelling, by the communication device, interference of wireless downlink communications between the first base station and the second base station, the cancelling comprising:
        calculating an equalizer solution that orthogonalizes the downlink signals from the first and the second base stations,
    wherein the communication device comprises a multiple-input and multiple-output (MIMO) communication device,
    wherein the communication device includes a receiver of M+N dimensions of MIMO spatial channels,
    wherein the first base station is associated with an M-dimension MIMO cell having M spatial channels and the second base station is associated with an N-dimension MIMO cell having N spatial channels such that the receiver of the communication device jointly connects to the M-dimension MIMO cell and the N-dimension MIMO cell simultaneously to orthogonalize the M and N spatial channels associated with the first and second base stations, respectively, and wherein each of M and N is a positive integer greater than 1.

2. The method of claim 1, wherein the receiving comprises receiving the wireless communication downlink signals in accordance with the Long-Term Evolution (LTE) standard of a variation thereof.

3. The method of claim 1, wherein calculating the equalizer solution comprises calculating a MIMO equalizer solution using a minimum mean square error (MMSE) method or a zero forcing (ZF) method.

4. The method of claim 1, wherein the receiving comprises attempting activation, by the communication device, in a first wireless network associated with the first base station when the communication device is in an area covered by a second wireless network associated with the second base station, and wherein a frequency spectrum used by the first wireless network and a frequency spectrum used by the second wireless network are the same.

5. The method of claim 4, wherein the first base station and the second base station are synchronized such that transmissions by the first and the second base stations occupy the same spectrum and that symbols from the first and the second base stations are approximately aligned to allow the communication device to receive signals from the first and the second base stations without inter-symbol interference over time.

6. The method of claim 5, wherein radio frames from the first and the second base stations are aligned such that reference signals from the first and the second base stations overlap in same resource elements of a resource grid.

7. The method of claim 1, wherein the communication device is aware of both the first base station and the second base station, and wherein the communication device detects primary and secondary synchronization signals from the first and the second base stations.

8. The method of claim 1, wherein a channel matrix associated with the wireless communication is constant over each of one or more 1-millisecond (ms) sub-frame intervals of the wireless communication.

9. The method of claim 1, wherein one of the first and the second base stations is associated with a macro-cell eNodeB, and wherein the other one of the first and the second base stations is associated with a small-cell eNodeB.

10. The method of claim 1, further comprising:
    attaching, by the communication device, to the first and the second base stations simultaneously.

11. A method, comprising:
    receiving, by a communication device, wireless communication downlink signals from a first base station and a second base station;
    generating, by the communication device, equations for the received signals in terms of channel coefficients and inverse fast Fourier transform (IFFT) input reference signals; and
    cancelling, by the communication device, interference of wireless downlink communications between the first base station and the second base station,
    wherein the receiving comprises receiving the wireless communication downlink signals in accordance with the Long-Term Evolution (LTE) standard of a variation thereof, and wherein the communication device comprises a multiple-input and multiple-output (MIMO) communication device,
    wherein the communication device includes a receiver of M+N dimensions of MIMO spatial channels,
    wherein the first base station is associated with an M-dimension MIMO cell having M spatial channels and the second base station is associated with an N-dimension MIMO cell having N spatial channels such that the receiver of the communication device jointly connects to the M-dimension MIMO cell and the N-dimension MIMO cell simultaneously to orthogonalize the M and N spatial channels associated with the first and second base stations, respectively, and wherein each of M and N is a positive integer greater than 1.

12. The method of claim 11, wherein the generating the equations comprises generating equations that orthogonalize the downlink signals from the first and the second base stations.

13. The method of claim 11, wherein the generating the equations comprises calculating a MIMO equalizer solution using a minimum mean square error (MMSE) method or a zero forcing (ZF) method.

14. The method of claim 11, wherein the receiving comprises attempting activation, by the communication device, in a first wireless network associated with the first base station when the communication device is in an area covered by a second wireless network associated with the second base station, and wherein a frequency spectrum used by the first wireless network and a frequency spectrum used by the second wireless network are the same.

15. The method of claim 14, wherein the first base station and the second base station are synchronized such that transmissions by the first and the second base stations occupy the same spectrum and that symbols from the first and the second base stations are approximately aligned to allow the communication device to receive signals from the first and the second base stations without inter-symbol interference over time.

16. The method of claim 15, wherein radio frames from the first and the second base stations are aligned such that reference signals from the first and the second base stations overlap in same resource elements of a resource grid.

17. The method of claim 11, wherein the communication device is aware of both the first base station and the second base station, and wherein the communication device detects primary and secondary synchronization signals from the first and the second base stations.

18. The method of claim 11, wherein a channel matrix associated with the wireless communication is constant over each of one or more 1-millisecond (ms) sub-frame intervals of the wireless communication.

19. The method of claim 11, wherein one of the first and the second base stations is associated with a macro-cell eNodeB, and wherein the other one of the first and the second base stations is associated with a small-cell eNodeB.

20. The method of claim 11, further comprising:
attaching, by the communication device, to the first and the second base stations simultaneously.

21. A device, comprising:
a first circuit configured to receive wireless communication downlink signals from a first base station and a second base station in accordance with the Long-Term Evolution (LTE) standard of a variation thereof; and
a second circuit coupled to the first circuit, the second circuit configured to:
generate equations for the received signals in terms of channel coefficients and inverse fast Fourier transform (IFFT) input reference signals; and
cancel interference of wireless downlink communications between the first base station and the second base station,
wherein one of the first and the second base stations is associated with a macro-cell eNodeB, and wherein the other one of the first and the second base stations is associated with a small-cell eNodeB,
wherein a channel matrix associated with the wireless communication is constant over each of one or more 1-millisecond (ms) sub-frame intervals of the wireless communication,
wherein the first circuit comprises a multiple-input and multiple-output (MIMO) communication device,
wherein the first circuit includes a receiver of M+N dimensions of MIMO spatial channels,
wherein the first base station is associated with an M-dimension MIMO cell having M spatial channels and the second base station is associated with an N-dimension MIMO cell having N spatial channels such that the receiver jointly connects to the M-dimension MIMO cell and the N-dimension MIMO cell simultaneously to orthogonalize the M and N spatial channels associated with the first and second base stations, respectively, and
wherein each of M and N is a positive integer greater than 1.

22. The device of claim 21, wherein the second circuit is configured to generate the equations using a minimum mean square error (MMSE) method or a zero forcing (ZF) method.

23. The device of claim 21, wherein a frequency spectrum used by a first wireless network associated with the first base station and a frequency spectrum used by a second wireless network associated with the second base station are the same, and wherein the first base station and the second base station are synchronized such that transmissions by the first and the second base stations occupy the same spectrum and that symbols from the first and the second base stations are approximately aligned to allow the first circuit to receive signals from the first and the second base stations without inter-symbol interference over time.

24. The device of claim 23, wherein radio frames from the first and the second base stations are aligned such that reference signals from the first and the second base stations overlap in same resource elements of a resource grid.

25. The device of claim 21, wherein the second circuit is configured to detect primary and secondary synchronization signals from the first and the second base stations.

* * * * *